(No Model.)

I. S. KRICK.
ANIMAL TRAP.

No. 334,784. Patented Jan. 26, 1886.

WITNESSES.
Morris A. Clark
Wm. McKinney

INVENTOR:
Irwin S. Krick
H. T. Snow & Co.
attys

UNITED STATES PATENT OFFICE.

IRWIN S. KRICK, OF CONNEAUTVILLE, PENNSYLVANIA.

ANIMAL-TRAP.

SPECIFICATION forming part of Letters Patent No. 334,784, dated January 26, 1886.

Application filed August 24, 1885. Serial No. 175,216. (No model.)

*To all whom it may concern:*

Be it known that I, IRWIN SOLOMONE KRICK, a citizen of the United States, residing at Conneautville, in the county of Crawford and State of Pennsylvania, have invented certain new and useful Improvements in Animal-Traps, of which the following is a specification, reference being had therein to the accompanying drawings.

My invention relates to animal-traps; and it consists in a combined bait and force trap so constructed and arranged to operate that, whether the animal sought to be taken is attracted to the bait or not, just so he gets upon a certain treadle or pan, the trap will be thrown and he will be caught; and to carry the invention into practice I employ a pan or flat treadle, to which the trip mechanism for throwing the spring bail or drop is attached. The pan is pivoted in a chambered base of the trap, and engages in the rear of the upright standard with the trip-wire, which extends upward, and is suitably pivoted at an angle which is formed in it, from which angle a horizontal arm projects forward, with a hook on the end to engage the spring-bail. This bail is formed with the coils shown, which surround a rod or center on the top of the base, and are then extended up and secured in the standard or back of the trap. The bait is secured upon a hook or support on the standard.

The accompanying drawings illustrate what I consider the best means for carrying the invention into practice.

Figure 1:
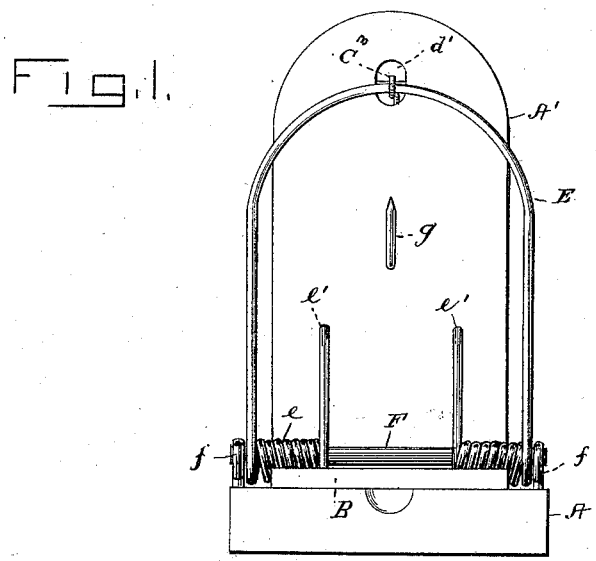
Figure 2:
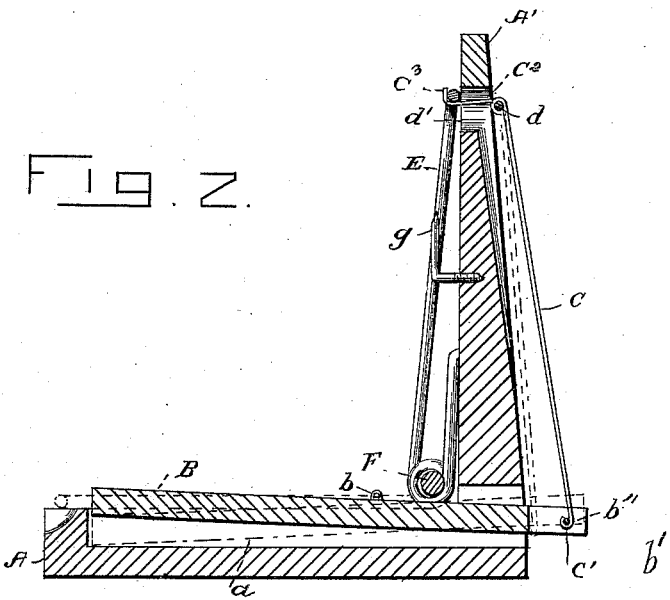

Figure 1 is a front view of the trap, and Fig. 2 is a central longitudinal section of the trap, showing the thrown position in dotted lines.

Similar letters of reference indicate corresponding parts in both figures.

A is the chambered base, and A' the standard or upright. The chamber in the base, for the sake of easy reference, is marked $a$.

B is the pan or flat broadened treadle, which lies in the chamber $a$ when the trap is thrown, but is slightly raised above it when the trap is set. It is pivoted in the base just in front of the coiled springs at $b$, as shown, and has an open slot, $b'$, in the rear, with a transverse bar, $b''$, in it. This bar engages the lower end of the trip-wire C in a hook, $c'$, which allows the bar to be readily freed. The trip-wire C extends up and is pivoted on a center, $d$, on top or in the rear of the standard A'. If this center $d$ is in the rear of the standard, there must be an opening or hole, $d'$, provided through said standard for the passage of the horizontal arm $c^2$ of the trip-wire. This arm $c^2$ is provided with a hook or catch, $c^*$, on its front end, which engages with the spring bail or hoop E when the trap is set. This bail is of the character common in this form of deadfall traps, and has the coils $e$ $e$ around a rod or bar, F, which is held in studs $f$ on the base A. After being thus coiled around the bar the ends of the wires are carried up and secured in the standard, as shown at $e'$ $e'$. A hook or pin, $g$, is provided for the bait on the standard A'.

It is apparent that the trip-wire may pass over the top of the standard instead of through a hole in it, as shown.

In setting the trap the bail or hook is brought into the upright position shown in full lines in the drawings and engaged with the hook $c^3$. Then the pan is tilted until it assumes the position shown in full lines in Fig. 2, and the bar $b'$ engaged with the hook on the bottom of the trip-wire. As thus conditioned, a slight weight or pressure upon the elevated front portion of the pan will disengage bar $b'$ and hook $c'$, which will allow force of bail E to pull down hook $c^3$ and fly down upon the base with great force. It will thus be seen that the bait need not be touched in order to throw the trap, but that if the animal so much as touch the pan it will be thrown and the animal be caught. It will also be seen that if the trap be set at a hole the animal cannot pass out without getting caught; or if it be set in runways or between boxes, barrels, or other articles, the animal cannot pass without throwing the trap and getting caught.

I am aware that an animal-trap consisting of a base, a movable treadle portion mounted in said base, an upright portion, a spring-loop, and a latch mechanism connected to the said upright and treadle, whereby the said treadle is rendered capable of releasing the spring-loop when pressure is applied, is not new, and I do not wish to be understood as claiming the same; but,

Having thus described my invention, what I desire to claim and secure by Letters Patent is—

The combination, in an animal-trap, of the base A, chambered as described, the upright portion A', provided with openings near its upper and lower ends, the pivoted treadle having the rear extension projecting through the lower opening in the upright, the spring E, and the latch C, pivoted to the upright at $d$, and provided with the hook $c^3$, projecting through the upper opening in the upright portion, and the hook $c'$ at its lower end, substantially as described.

In testimony whereof I affix my signature in presence of two witnesses.

IRWIN S. KRICK.

Witnesses:
CHAS. W. HAMMON,
A. J. HARPER.